US007550022B2

(12) United States Patent
Smith

(10) Patent No.: US 7,550,022 B2
(45) Date of Patent: Jun. 23, 2009

(54) PORTABLE SYSTEM FOR CAPTURING AIR POLLUTION

(76) Inventor: William C. Smith, 16752 Calle De Marisa, Pacific Palisades, CA (US) 90272

( * ) Notice: Subject to any disclaimer, the term of this patent is extended or adjusted under 35 U.S.C. 154(b) by 86 days.

(21) Appl. No.: 11/677,147

(22) Filed: Feb. 21, 2007

(65) Prior Publication Data

US 2007/0295210 A1 Dec. 27, 2007

Related U.S. Application Data

(60) Provisional application No. 60/815,594, filed on Jun. 22, 2006.

(51) Int. Cl.
*B01D 47/02* (2006.01)

(52) U.S. Cl. ............... 55/385.1; 55/385.2; 55/DIG. 18; 55/DIG. 46; 55/383; 55/467; 55/473; 55/356; 118/326; 454/50; 454/53; 454/63; 96/351; 96/352

(58) Field of Classification Search ................ 55/385.1, 55/DIG. 18, DIG. 46, 385.2, 383, 467, 473, 55/356; 118/326; 454/50, 53, 63; 96/351, 96/352; 427/421.1
See application file for complete search history.

(56) References Cited

U.S. PATENT DOCUMENTS

| | | | | |
|---|---|---|---|---|
| 1,223,809 | A * | 4/1917 | Lilibridge | 427/421.1 |
| 2,788,954 | A * | 4/1957 | Paasche | 261/5 |
| 3,801,869 | A * | 4/1974 | Masuda | 361/227 |
| 4,192,462 | A * | 3/1980 | Erickson | 239/288 |
| 4,532,886 | A * | 8/1985 | Bouchard | 118/326 |
| 4,770,088 | A * | 9/1988 | Kistner | 454/50 |
| 4,851,261 | A * | 7/1989 | Gelain et al. | 427/195 |
| 4,932,354 | A * | 6/1990 | Kistner | 118/305 |
| 4,934,308 | A * | 6/1990 | Boyce et al. | 118/326 |
| 5,088,511 | A * | 2/1992 | Bain | 134/200 |
| 5,306,332 | A * | 4/1994 | Allen | 95/273 |
| 5,336,128 | A | 8/1994 | Birdsong | |
| 5,393,345 | A * | 2/1995 | Smith | 118/312 |
| 5,474,609 | A * | 12/1995 | Mulder et al. | 118/308 |
| 5,536,315 | A * | 7/1996 | Guzowski et al. | 118/301 |
| 5,612,096 | A * | 3/1997 | Mulder et al. | 427/466 |
| 5,670,202 | A * | 9/1997 | Guzowski et al. | 427/8 |
| 5,688,323 | A * | 11/1997 | Kane et al. | 118/326 |
| 5,688,329 | A * | 11/1997 | Poague | 118/505 |
| 5,690,740 | A * | 11/1997 | Smith | 118/300 |
| 5,702,493 | A * | 12/1997 | Everetts et al. | 55/356 |
| 6,143,048 | A | 11/2000 | Comproni et al. | |
| 6,171,656 | B1 * | 1/2001 | Settles | 427/294 |
| 6,264,711 | B1 * | 7/2001 | Smith | 55/385.1 |
| 6,395,047 | B1 | 5/2002 | Smith | |
| 6,607,573 | B1 | 8/2003 | Chaurushia et al. | |

(Continued)

*Primary Examiner*—Duane Smith
*Assistant Examiner*—Minh-Chau T Pham
(74) *Attorney, Agent, or Firm*—Latimer, Mayberry & Matthews IP Law, LLP

(57) ABSTRACT

The present invention provides a portable system for capturing airborne pollutants and methods for using the portable system. The apparatus includes at least one flexible and maneuverable source containment means that can be connected to an atomizer, such as a spray gun or aerosol can or can be positioned near or over an open container giving off airborne pollutants. At least one suction generator allows air flow from the source containment means to at least one filter that may be attached or detached from its source of suction. After filtration, the apparatus includes at least one exhaust means to remove the treated air from the proximity of the user.

17 Claims, 11 Drawing Sheets

U.S. PATENT DOCUMENTS 7,208,031 B1 * 4/2007 Hendrickson ................ 96/351
2004/0046049 A1 3/2004 Ricciardelli et al.
2006/0272575 A1 12/2006 Monterrosa

* cited by examiner

PORTABLE SYSTEM FOR CAPTURING AIR POLLUTION

CROSS-REFERENCE TO RELATED APPLICATIONS

This application relies on the disclosure of and claims the benefit of the filing date of U.S. provisional patent application No. 60/815,594, filed on 22 Jun. 2006, the entire disclosure of which is hereby incorporated herein by reference.

BACKGROUND OF THE INVENTION

1. Field of the Invention

The present invention relates to the field of capturing airborne molecules. More specifically, the invention relates to an apparatus and methods to capture airborne pollutant molecules using a portable air pollution capture system.

2. Description of Related Art

Air pollution is the contamination of the air by noxious gases and minute solid and liquid particles. Air pollution has an immense effect on the environment, such as causing the atmosphere to warm, resulting in the "greenhouse effect". Air pollution also has an effect on human health. The effects of air pollution on human health include damage to the immune system as well as neurological, reproductive, developmental, respiratory, and other health problems. In addition, air pollution has been linked to an increased risk of stroke as well as lung cancer. Some persistent air pollutants can accumulate in body tissue, causing damage over long periods of time.

Breathing contaminated air is one way in which people are exposed to toxic air pollutants. Breathing such air is especially hazardous for workers that deal with air pollutants on a daily basis. An example of this situation is a worker (fabricator) that employs a standard hand spraying device to spray paint on a machine in an assembly line, which is an unenclosed and therefore unprotected work area. In this situation, the worker is often exposed to aerosolized toxins or toxic fumes.

There are several common protective measures used currently to minimize exposure to toxic air pollutants. One method often used is a respirator or protective suit for a worker to wear. However, this reduces the efficiency of the worker and can be uncomfortable for the worker if worn for long periods of time. Another protective measure currently taken is a paint spray booth or other isolated area containing a filtration and exhaust system. This method is costly and inflexible because it usually requires the construction of a booth on site, and is energy intensive.

Pre-packaged aerosol cans are used not only by factory workers, but by the general consumer. These aerosol cans contain a propellent that entrains such agents as paint, lubricant, adhesives, and cleaners. It has been determined that the transfer efficiency or the percentage of the agent that adheres to the object of the spray is a maximum of about 20%. Therefore, 80% of the product is released to the surrounding atmosphere. The size of the particles released vary, although it is known that many of them are small. It has been shown that the smaller the particle size, the greater the chance that the particle will migrate to the lung. Larger size particles may be captured by the hair follicles in the nose or ingested.

To contain the over-spray from an aerosol can, U.S. published patent application No. 2004/0046049 A1 to Ricciardelli and U.S. published patent application No. 2006/0272575 to Monterrosa disclose an over-spray shield that fits an aerosol can. Although these address a need in the art, neither are completely satisfactory because neither provide a filter system or a suction generator to remove over-spray from the immediate area of the worker.

U.S. Pat. No. 5,336,128 to Birdsong teaches an apparatus for removing fumes from the work area of a nail technician. The apparatus comprises a transparent hood, a filter means, and a vacuum cleaner. However, the capturing device part of this apparatus is fixed and cannot be moved easily around the work area. Therefore, it is not portable in a way that would allow it to capture over-spray from painting a car, for example. In addition, the vacuum cleaner used in the invention would have the potential of causing an explosion when acetone and other volatile compounds are conveyed into it by suction.

U.S. Pat. No. 6,143,048 to Comproni and U.S. Pat. No. 6,607,573 to Chaurushia show an air pollution control apparatus comprising a pollutant collector member, a vacuum system, and a filter system. However, like other solutions known in the art, this invention does not contain an exhaust system to remove the air from the vicinity of the user after being filtered or the option to separate the filter housing from the motor blower. Also, this invention does not comprise a pollutant collector member that will immediately capture airborne pollutants from an atomizer.

U.S. Pat. No. 6,395,047 B1 and its continuation-in-part U.S. Pat. No. 6,616,720 B1 by Smith, the inventor of the present invention, teach an airborne contamination control system with a main device unit and a remote unit. This apparatus comprises air intake ports to which two suction ducts or more can be affixed, a motor blower, a filter system, and an exhaust system. While effective, this invention does not comprise a pollutant collector member that will immediately capture airborne pollutants from an atomizer or the ability to easily carry the apparatus.

Although many solutions for reducing release of pollutants have been developed, there exists a need in the art for an air pollution capture device that is cost-effective, flexible in movement, easy to use, and has the ability to immediately contain the pollution generated.

SUMMARY OF THE INVENTION

The present invention addresses needs in the art by providing a Portable System for Capturing Air Pollution (also referred to herein as "CAPS"). As a general matter, this system reduces the amount of air pollution released to the environment. Therefore, it reduces the amount of toxins, pollutants, or other airborne particles and vapors that might be inhaled or ingested by the user or other people in close proximity to the user. Typically, the system of the present invention comprises at least one source containment means; at least one suction means to generate air flow from the source containment means to at least one filter means; at least one filter means that traps air pollutant molecules (including vapors); and at least one exhaust means to remove the treated air from the proximity of the user. The source containment means can be made to immediately capture or contain air pollutant molecules upon release from a source. In embodiments, the system of the present invention is portable and can even be carryable in some configurations. Of course, the invention also provides each of the various elements or means of the system independently of the other elements. For example, the invention provides for the source containment means as a separate, independent device apart from the system as a whole. In addition, the present invention provides methods for the capture or containment of air pollution using the portable air pollution capture system.

In one embodiment, the CAPS system comprises a standard spray gun, a standard aerosol spray can, or the like for dispensing a fluid, which can cause release of airborne pollutants. In another embodiment, the CAPS system comprises a combined filter enclosure and suction generator. In yet another embodiment, the filter enclosure and the suction generator are separated but still in communication. Yet again, another embodiment of the CAPS system comprises a system that can be carried on the back of the user or is otherwise portable.

Broadly speaking, in one aspect, the present invention provides a device that reduces the release of at least one airborne molecule into the environment or contains at least one airborne molecule and reduces its release into the environment. Preferably, the airborne molecule is a pollutant, such as a solid particle or gaseous vapor that is dangerous to the health of a human or animal if inhaled or ingested. Generally, the airborne pollutant molecule is small enough to be taken into the human body in some way by exposure to the molecule. The device is referred to herein at times as a source containment means or containment cage. Typically, the device is connected to one or more other devices to form a CAPS system.

In another aspect, the present invention provides methods to reduce the release of at least one airborne pollutant molecule into the environment or to contain at least one airborne pollutant molecule and stop its release into the environment. In general, the methods of the invention comprise employing the portable air pollution capture apparatus to eliminate or reduce the number of airborne pollutant molecules released into the environment. The method can comprise: connecting a system according to the invention to a device for containing or distributing a composition comprising at least one pollutant; and employing the system. In embodiments, the method comprises employing the containing or distributing device as well. Typically, the act of employing the system comprises causing the suction means of the system to create suction through the source containment means and filtration means of the system, resulting in exhausting of air into the environment through the exhaust means.

BRIEF DESCRIPTION OF THE DRAWINGS

The accompanying drawings, which are incorporated in and constitute a part of this specification, illustrate several embodiments of the invention and, together with the written description, serve to explain certain principles of the invention. The drawings should not be considered as a limitation on the scope of the invention, but rather should be recognized as providing some non-limiting details of certain features or embodiments of the invention.

DETAILED DESCRIPTION OF VARIOUS EMBODIMENTS OF THE INVENTION

Figure 1:
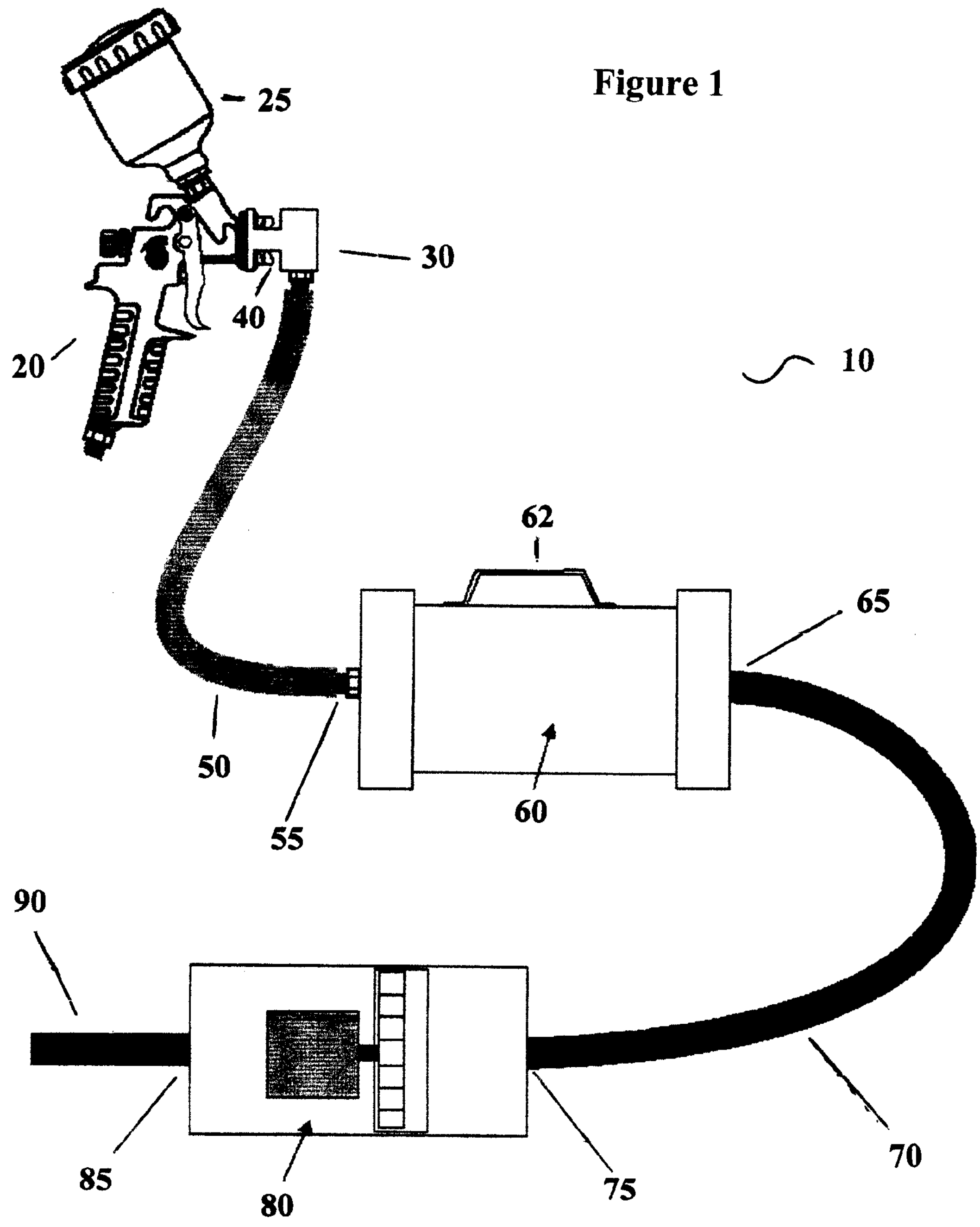
FIG. 1 shows an embodiment of the CAPS system of the invention being employed with a standard spray gun.

Reference will now be made in detail to various exemplary embodiments of the invention, examples of which are illustrated in the accompanying drawings. The following detailed description is provided to give details on certain embodiments of the invention, and should not be understood as a limitation on the full scope of the invention.

In a first aspect, the present invention provides a system that reduces the release of at least one airborne molecule into the environment. As a general matter, the system comprises means for containing or controlling the release of airborne particles and vapors, such as pollutants, into the environment; means for generating a negative pressure within and immediately proximate to the containment means; means for filtering air and airborne particles and vapors in the air that were contained or captured by way of the negative pressure; and means for exhausting the filtered air into the environment. As a non-limiting example, a containment cage is connected by way of an air-tight and/or water-tight seal to a suction hose on one end of the hose, and the other end of the suction hose is connected by way of an air-tight and/or water-tight seal to a filtration unit comprising one or more filters. The filtration unit is connected by way of an air-tight and/or water-tight connection to a suction generator, which, when operated, creates a negative pressure across the system from its proximal end through to the containment cage. The distal end of the suction generator exhausts filtered air into the environment. In preferred embodiments, the distal end of the suction generator is connected to an exhaust hose that permits the exhaust air to be exhausted to the environment at a site that is distant from the containment cage.

The system of the invention is useful, among other things, for containing, capturing, and/or controlling the release of substances in the air within or immediately proximate to a container that releases such substances. Although any type of substance can be contained, typically, the airborne substances are or comprise one or more pollutants, and particularly those that adversely affect the environment or human or animal health. The airborne pollutants can be in the form of a gas or vapor, a solid, or a liquid. Among the many pollutants that may be contained, some non-limiting examples include: oxides of carbon, sulfur, and nitrogen; volatile organic compounds; dioxin; asbestos; toluene; metals or metal containing substances, such as cadmium, mercury, chromium, and lead; pollutants found in paint or cleaning chemicals; and any other liquid or solid that would be emitted from an atomizing device or diffused into the air. Volatile organic compounds (VOCs) are common toxins found in high performance coatings and include organics, aliphatics, aromatics, and chlorinated hydrocarbons. Specific examples of VOCs include acetone, ketone, trichloroethylene, methyl tert-butyl ether (MTBE), chloroform, methylene chloride, benzene, perchloroethylene, and formaldehyde. Of particular interest in some embodiments are greenhouse gases, such as carbon dioxide, methane, and various VOCs.

In addition, the pollutants envisioned by the present invention include those that are present in insecticides, herbicides, and other compositions that are used for killing or controlling animals, insects, and plants. Other non-limiting examples of pollutants include those present in or released by cleaners or cleaning solutions. The system of the present invention thus may be used within any industry or setting where pollutants are generated and escape into the environment. While not so limited, the invention finds advantageous use in the painting industry or industries requiring the application of paints and other coatings (including adhesives and the like) to surfaces; the insecticide industry or other industries requiring or desiring application of insecticides to surfaces; the herbicide industry, or other industries requiring or desiring application of herbicides to surfaces; and the cleaning industry. Among the many settings where the system may be advantageously employed are industrial factories, farms, commercial office properties or other settings where humans can work, and houses and other dwellings for humans and animals.

The size of the airborne pollutant molecule can vary. In general, the size can range from about 1000 micrometers to about 0.1 nanometers (1 angstrom). In embodiments, the pollutants range in size from about 100 micrometers to about 0.3 nanometers. In other embodiments, the pollutants are less than 10 micrometers in size, such as particles that range in size from about 10 micrometers to about 0.3 nanometers or less, such as from about 10 micrometers to about 0.01 micrometers or from about 0.01 micrometers to about 0.3 nanometers. In embodiments, the majority of the size of the airborne particles are less than 10 micrometers, for example within the range of 150 nanometers to 1 nanometers, such as from 150 nanometers to 10 nanometers. By majority, it is meant at least 50.1%, such as 55%, 60 %, 75%, 90%, 99%, or greater, or any specific value within the range of 50.1% to 100%. Of course, the ranges specifically disclosed herein include any specific size or size range within the general sizes recited, and one of skill in the art can immediately recognize all of the specific sizes and ranges without the need for each to be individually recited herein. According to the invention, the term "about" is used to indicate a margin of error for a statistically significant portion of the particles of 5%. Thus, pollutants of a size of 10 micrometers include those in which a majority of the particles fall within the range of 9.5 micrometers to 10.5 micrometers.

The system comprises a source containment means. The source containment means can be any means that contains or captures airborne pollutants emanating from compositions that are manufactured for use by applying to a surface (e.g., paints, cleaning solutions, adhesives, etc.). Non-limiting examples of source containment means include devices that are capable of being connected to 1) at least one source of pollutants, and 2) at least one source of negative pressure, and which have the ability to take in environmental air as a result of the negative pressure (referred to herein as "make-up" air). As used herein, such a device is variously referred to as a source containment enclosure, a containment shield, an overspray capture enclosure, a containment cage, and an air pollution source containment enclosure. The actual structural design of the source containment means is not limited to any one particular size, shape, or overall dimensioning. Rather, the particular features of the device and their placement in relation to each other will change from embodiment to embodiment, to achieve a suitable, and preferably optimal, containment of pollutants for each container to which the system is applied.

The source containment means may have a variety of general shapes, including but not limited to a cylinder, a tapered cylinder or cone, a partial cylinder with a plurality of depending elements, or any other generally cylindrical shape. The containment means can also have a noncylindrical shape such as a cross section that is substantially round, elliptical, oblong, square, rectangular, pentagonal, hexagonal, octagonal, etc. It likewise may shift along one or more of its axes from one general shape to another, for example by changing from a generally round shape at its proximal end to a generally elliptical shape at its distal end. The containment means may also be generally flat (e.g., a highly flattened ellipse or rectangle), such that it does not contain much volume within it, yet can still transmit negative pressure from the suction means and take in make-up air. As a general matter, the source containment cage will have at least one outer surface defining an exterior of the cage, at least one inner surface defining an interior of the cage, a proximal end comprising a surface having at least one opening, a distal end comprising a surface having at least one opening, and at least one opening in the inner and outer surfaces, which are in communication with each other to form a passage through the inner and outer surfaces, and which may be for attachment to an evacuation means.

The containment means may be made of any material or combinations of materials that allow it to function. Non-limiting examples of suitable materials include metal and alloys of metals, plastics, and other man-made materials, and in particular polymeric materials. Of course, one should select the materials for fabrication in light of the intended use of the containment means. For example, if the containment means is to be used in the painting industry, one should fabricate the containment means from a substance that is resistant to degradation by solvents, etc. present in paints. Non-limiting examples of materials that can be used to make a containment means include thermoset plastics and thermoplastic polymers. Specific non-limiting examples include polyvinyl chloride (PVC), polyethylene terephthalate (PET), high-density polyethylene (HDPE), low-density polyethylene (LDPE), polypropylene, polystyrene, polycarbonate, and acrylonitrile-butadiene-styrene (ABS). Elements of the containment means that are made of the same material may be produced as a unitary structure or may be connected by any convenient means, such as by way of fusion, adhesion, mechanical fastening, and the like. Elements of the containment means that are made of different material may be attached to each other by any suitable means, including, but not limited to, use of adhesives, use of mechanical fasteners (e.g., screws, bolts and nuts, rivets), and friction fit (e.g., screw threads).

As mentioned above, the containment means may be fabricated from any suitable material or materials. In embodiments, it is fabricated from materials that may be cleaned to remove any residual composition after having been used to dispense or capture the composition or parts of it. Alternatively, the containment means may be disposable, and designed for use only a single or a few times. Where the containment means is designed to be disposable, one may select materials for fabrication that are less than completely resistant to degradation by the substances in the composition to be contained or dispensed. In this way, a functional containment means may be fabricated, which is stable for one or a few uses, but then discarded prior to the time where significant degradation occurs. Materials for use in disposable containment means can be less expensive or easier to work with than other materials. Likewise, disposable containment means can reduce or eliminate the need for cleaning of the containment means, which provides a cost savings for use. Of course, other components of the present system may be disposable as well.

The source containment means comprises at least one attachment means for attaching it to a container containing a pollutant or capable of releasing a pollutant. The container is not limited in size or shape because the attachment means of the source containment means may be designed to accommodate any shape needed. Accordingly the attachment means can take any suitable shape, and will be designed in conjunction with the size, shape, and optionally other features of the container to which it is to be attached. In some embodiments, the attachment means for attaching to a container comprises a structure that provides an air-tight or water-tight connection, whereas in other embodiments, the connection is not air-tight or water-tight. Preferably, the connection means allows for connection and disconnection of the source containment means from the container (e.g., a releasable connection). Non-limiting examples of structures of the attachment means include those that create a connection by way of friction between two surfaces, such as by way of complementary screw threads; those that create a mechanical linkage, such as by way of latches, through pins, screws, and fasteners; those that create a connection by way of fusion of two surfaces, such as by welding, soldering, and melting; and those that create a connection by way of bonding of two surfaces, such as by way of adhesives. In general, and for ease of reference herein, the attachment means for attaching the source containment means to a container is located at the proximal end of the source containment means.

The system of the present invention is quite versatile, allowing for use with unlimited sizes and shapes of containers for storing and/or dispensing substances. Thus, among the various embodiments of the source containment means are those that attach to devices designed to dispense substances, such as on to a surface. Other embodiments include those that attach to containers that contain substances that release pollutants, such as jars, bottles, vats, tubs, and buckets. As these various types of containers have numerous different sizes and shapes, the attachment means of the containment means may vary accordingly. In essence, the size and shape of the attachment and the container to which the containment means is attached is not critical to practice of the invention, and the design of the containment means may be adjusted depending on the type of container to which it is attached.

The attachment means for attaching to the container can be integral with the source containment means as a whole, or can be attached to the rest of the source containment means by any suitable connection. For example, the entire source containment means may be fabricated in a mold out of a single plastic or metal, and include an attachment means for attaching it to a container. Alternatively, the attachment means may be fabricated as a separate piece (optionally from a material that is different from that of the rest of the source containment means), and connected to the rest of the source containment means by way of straps, rods, pins, screws, or other connectors. In this way the source containment means may be adapted to connect to numerous containers without the need to fabricate an entire source containment means.

The attachment means for attaching to the container can comprise a connector element as the main aspect of the element, or can comprise additional elements. For example, where the container is not conveniently shaped or sized to allow ease of use of the containment cage, the attachment means may comprise an extension or adaptor to improve convenience. While not limited in its size or shape, one non-limiting example of such adaptors is a funnel-shaped extension that reduces the size of the connection from a relatively large size (at the container) to a relatively small size (at the proximal end of the source containment means). Another non-limiting example of an adaptor is a suitable length of rigid tubing, piping, or the like that effectively extends the exit port of the container (e.g, aerosol spray can nozzle) to the proximal side of the containment cage. For example, a metal tube can extend from one to four inches from the spray nozzle of a spray can to the containment cage proximal end to accommodate facile combination of the containment cage to a spray gun attached to the can. The length of the connector element can be varied depending on many considerations, but is typically designed to ensure proper fit of the cage within the context of the device that is used to apply, release, spray, etc. the substance in a container.

In general, the containment means is configured such that a substance contained in a container exits the container and enters the proximal end of the source containment means. The substance then traverses at least a portion of the containment means from the proximal end toward the distal end. The substance then exits the distal end and impacts a surface onto which it is intended to be applied. Particles, vapors, etc. that do not impact the surface, or that impact but are then released, can be captured or contained by the source containment means, and, as described below, removed from the environment. Thus, from one vantage point, the source containment means can be a structure through which compositions flow prior to being applied to a surface of interest, and by which pollutants from those compositions are contained, captured, and/or eliminated from the environment.

The source containment means also comprises at least one attachment means for attaching it to an evacuation means. Like the attachment means for connecting to a container, this attachment means can be of any suitable size, shape, and material. In general, it is designed to provide adequate removal of air and airborne particles, vapors, etc. to reduce or eliminate release of such particles, vapors, etc. into the environment when a composition is released from its container. The attachment means is likewise designed in conjunction with the size of the source containment means, the volume of fluid that can be moved by the evacuation means per unit time, and the volume of composition to be released by the container per unit time. In addition, like the other attachment means, this attachment means can be designed to create a permanent or impermanent (e.g., releasable) connection to the evacuation means, and thus can have a structure as defined above. Preferably, the connection is releasable to allow removal of elements, for example to clean or replace them. In exemplary embodiments, the attachment means for attaching to an evacuation means is a hollow element, such as but not limited to one that is generally cylindrical, that provides an attachment surface for a tube or hose that connects to it by way of friction between the surfaces of the two elements.

In general, make-up air, which is air from the environment that ultimately is drawn into and released from the system, may enter the system from either or both of the proximal and distal ends of the source containment means. In embodiments, it may also enter from an entrance port, hole, passage, etc. that is disposed within a wall defined by the interior and exterior surfaces of the source containment means. Make-up air provides numerous functions for the system in its various embodiments. For example, in embodiments, the make-up air acts to provide adequate volume to contain and remove pollutants from the environment immediately in proximity to the containment cage. In some embodiments, the make-up air entering from the proximal end of the containment cage acts to focus the deposition of substances onto the target surface by forcing particles that would otherwise exit the spray pattern back into the spray pattern, or by creating an inward-driving force that limits scatter of the particles from the main spray pattern. In some embodiments, make-up air entering from the distal end of the containment cage captures or contains particles and vapors that would otherwise be released into the environment or would be applied to the target surface outside of the target zone (e.g., overspray), and removes them from the environment. Additionally, make-up air can represent air that is moved into the evacuation means to permit the substance intended for application to a surface to impact the surface (for example, rather than being removed from the environment before it can impact the target surface).

As mentioned above, the source containment means can be fabricated in numerous sizes and general shapes. In general, it is designed to complement the particular goal of release of the substance(s) in the container to which it is attached. Thus, for example, where the source containment means is attached to an aerosol spray can having a spray pattern that is circular, the source containment means can be a containment cage having a round cross-section. Alternatively, where the source containment means is attached to a hand pump for spraying a protectant for a home deck (e.g., wood preservative) in an elongated, flat spray pattern, the source containment means can be a containment cage that is elliptical or rectangular in cross-section. Numerous other examples will be immediately apparent to those of skill in the art.

Attached to the source containment means is a source containment evacuation means. The source containment evacuation means can be any means that permits air and airborne particles in or around the source containment means to be removed from the immediate area of the source containment means. For example, the evacuation means may be a suction hose or tube that is attached to the source containment means on one end, and connected, either directly or ultimately, to a suction means, such as a vacuum source. In practice, airborne pollutant particles are contained by the source containment means and evacuated into the evacuation means as a result of the negative pressure within the evacuation means. The evacuation means, e.g., suction hose, may be of any suitable cross-sectional shape (e.g., circular, oval, hexagonal) and length, and have any suitable inner and outer surface measurements (e.g., diameters, perimeters). In general, the length and cross-sectional size will be selected based on the length between the source containment means and the filtration means and/or suction means, taking into consideration the application for which the apparatus will be used. The length thus may be as short as 1 meter or less for a backpack style system, or as long as two or more meters for a larger system. The longer the length of the evacuation means and/or the larger the internal cross-sectional area of the evacuation means, the greater the power required to generate adequate suction to remove the airborne pollutant particles from the air. The evacuation means (e.g., suction hose) may be flexible or inflexible. Likewise, it may be made of any material that allows it to function as a conveyor of the airborne pollutant particles, such as rubber, metal, or plastic. Of course, the material(s) from which the evacuation means is fabricated should be selected based on the type of pollutants to be contained. For example, if the system is designed to contain acetone, the evacuation means should be fabricated from materials that are resistant to degradation by acetone. Suitable materials are numerous and well known in the art. Non-limiting examples of materials include: metal or metal alloys, such as stainless steel; plastics and other polymeric materials, such as vinyl, PVC, nylon, polypropylene, HDPE, LDPE, perfluorokoxyalkane (PFA), polystyrene, polyethylene, SARAN, and the like; and rubber or man-made rubbers, such as natural rubber (Isoprene), synthetic rubber (Polyisoprene), Styrene Butadiene Rubber (SBR), Nitrile (Acrylonitrile Butadiene Rubber), Neoprene® (Polychloroprene), and EPDM (Ethylene Propylene Diene Monomer), and the like.

In general, the evacuation means can be defined as a structure that provides for connection of the source containment means to the suction means. While not being limited to any particular structure, it is often in the form of a tube, hose, pipe, or other hollow structure through which fluids can pass. The structure can be generally described as follows, with reference to an exemplary embodiment of a plastic hose: at least one outer surface defining an exterior of the hose; at least one inner surface defining an interior of the hose, a proximal end comprising a surface having at least one opening; and a distal end comprising a surface having at least one opening. The size of the cross-section of the inner surface is less than the size of the cross-section of the outer surface, and together they form a wall with an interior passage for fluid flow.

In embodiments, the evacuation means is a hose of sufficient length to allow a worker to move about and use the source containment means at a significant distance from the filtration means and suction means. For example, a system may be devised where the filtration means and suction means are placed outside of a work zone, and an evacuation means of a significant length is provided such that a worker may enter the work zone and use the source containment means without the need to also bring along the filtration means and suction means. Exhaustion means of 3 meters, 4 meters, 5 meters, 10 meters, or more may be provided to allow workers to move about at some distance from the filtration and suction means. Of course, in embodiments where the entire system is designed as a back-pack unit, such a long evacuation means would typically be unnecessary.

The negative pressure found within the source containment means, which results from the suction means (discussed in detail below) being connected to it via the evacuation means, permits airborne pollutants emanating from such compositions to be immediately contained or captured by the present invention. By immediately contained or captured, it is meant that the pollutants are removed from the environment before they travel more than 10 centimeters from the distal end of the containment means. Preferably, the pollutants are removed from the environment before they travel 5 centimeters, more preferably before they travel 3 centimeters, and most preferably before they travel 1 centimeter or less from the distal end of the containment means. For example, when aerosol pollutant molecules are released into the atmosphere by an atomizer such as a spray gun or aerosol can, the source containment means captures much, if not all, of the over-spray from the aerosol. This allows the spray to be directed to the object of the spray and reduces the airborne pollutant molecules that are released into the environment as a result of the spraying action.

The system comprises filtration means for filtering air and airborne particles that are evacuated from or near the source containment means. The filtration means may be any means that is capable of removing airborne particulate material or vapors, including but not limited to particulate pollutants and VOCs. As a general matter, in preferred embodiments, the filtration means is connected to the evacuation means, which in turn is connected to the source containment means. The filtration means is typically one or more filters, of the same or different composition, housed in an air-tight container. The filter(s) are disposed within the container or housing such that air entering the proximal end must pass through the filter(s) before exiting the container via the distal end. Any structure that is suitable for housing one or more filters is contemplated by the invention, and numerous such structures are commercially available and/or known in the art. As is understood in the art, the structures may be fabricated of any suitable materials, including, but not limited to metals, plastics, wood, glass, and other natural and man-made materials. Preferably, the structure is capable of being opened for ease of removal and replacement of filters, and for cleaning.

In exemplary embodiments, air and airborne particles are conveyed by a suction hose from the source containment means to a lightweight enclosure that comprises at least one filtration means, such as one or more filters. In practice, the filters reduce or remove some or all of the airborne pollutant molecules evacuated into the system, thereby benefitting the user, other people in the vicinity of the pollution, other work elements, and the environment. Preferably, at least one of the filters is approved by a federal, state, or local agency responsible for monitoring and regulating pollution. For example, it can be certified or approved under the National Emissions Standards for Hazardous Air Particles (NESHAP) guidelines. It also may be designed to satisfy international standards for emissions. In other embodiments, the filtration means may include a pre-filter to capture large particles, a HEPA filter to capture small particles, and/or a carbon filter to reduce VOCs. Many such filters are known in the art and are commercially available, and those of skill in the art are free to select appropriate filters and combinations of filters based on any number of considerations, including the identities of compounds in the compositions to be applied to the surface of interest. Where multiple filters are employed, the number and order (with respect to the linear movement of air through the system) may be selected by the practitioner based on any number of considerations, the selection being well within the level of skill in the art. Accordingly, identical filters or different filters can be employed in system of the invention. Preferably, more than one type of filter is used so that multiple pollutants can be captured. Of course, any filter may be used in this apparatus to achieve the function of reducing or removing airborne pollutant molecules from the contaminated air conveyed to the filter system.

The system also comprises a suction means. The negative pressure found within the source containment means, the evacuation means, and the filtration means is a result of the suction means that comprises part of the present system. Examples of suction means include, but are not limited to, a suction generator, such as a motor-blower and a regen set. Of course, any suction generator can be used in the invention, including any of the various generators known in the art. The suction energy provided by the motor of the suction generator may be matched to whatever evacuation energy is required. In embodiments comprising a large CAPS system, large sizes (horsepower) of suction generators will be needed. In embodiments comprising small CAPS systems, smaller sizes of suction generators will be needed. Preferably, the suction generator is explosion proof.

The suction means can be provided as a stand-alone component of the system, or it may be provided as an integral unit with the filtration means. For example, in embodiments, a single housing is provided that contains both filters and a suction generator, with a single intake port and a single exhaust port. Regardless of the configuration of the suction means and filtration means, it is preferred that the suction means be placed distal ("downstream") of the filtration means in order to better ensure that harmful airborne particles do not foul, contaminate, or otherwise contact the elements of the suction means.

The system of the invention comprises an exhaustion means. The exhaustion means is any means that can act to remove air and any remaining airborne particles from the immediate vicinity of the source containment means. In preferred embodiments, it removes air and airborne particles from the immediate vicinity of a worker using the system. As a general matter, the exhaustion means comprises at least two outlets in communication with each other. One outlet (also to be considered as an inlet) is connected to the suction means through any suitable connection means. One or more other outlets open to the environment at a distance from the inlet. In embodiments, the exhaustion means is a tube or hose that connects on one end to the suction means, and is of sufficient length to transfer the air exiting the suction means to an environment that is distant from the person using the system. For example, the exhaustion means may transfer exhaust from the suction means at least one meter from the worker, at least five meters from the worker, or at least 10 meters from the worker. It likewise may transfer the exhaust out of the room in which the system (and/or worker) is located, such as to the outside of a building or to a separate collection tank. As with the evacuation means, the suction energy provided by the suction means should be matched to the size and length of the exhaustion means to ensure that adequate power is provided to not only provide suction for the evacuation means, but to provide adequate power to force air out of the end of the exhaustion means. Those of skill in the art are well qualified to make the necessary calculations to match power to size and length of all of the various possible combinations of evacuation means and exhaustion means contemplated by the present invention.

In practice, after air goes through the filtration means (and typically the suction means as well), it can be conveyed by an exhaustion means to the environment. The present invention allows the exhaustion means to evacuate the treated air out a window, porthole, etc., to another location remote from where the work is being performed. This allows the user and other people in the vicinity to be protected from any airborne pollutants that may remain in the treated air, such as VOCs. Like the evacuation means, the exhaustion means may be a hose, tube, pipe, or any other structure that is able to carry air or other fluids away from the user. It can be of any chosen length depending on how far the treated air needs to be evacuated. The exhaustion means may be made of any flexible or inflexible material that will allow the treated air to be conveyed from the CAPS system to the environment, such as rubber, plastic, and metal. Considerations for selection of materials will generally follow those discussed above.

In embodiments, the system comprises means for applying a liquid to a surface. In general, the means is any device that can accomplish this act, such as an atomizer (e.g., sprayer). In one embodiment, the device is a spray gun. In another embodiment, the device is an aerosol can. In other embodiments, the atomizing device is a pump spray or any device that is capable of applying a liquid to a surface, but has the associated effect of releasing one or more pollutant molecules into the air. In a typical commercial or consumer use of spray equipment, airborne pollutant molecules are released into the atmosphere as a result of use of some sort of atomizing device or by a natural means (e.g., evaporation). Thus, in some embodiments, the apparatus does not comprise means for applying a liquid to a surface, but comprise other means for reducing the release of molecules into the atmosphere by natural processes, such as by simple diffusion of molecules or by wind current.

As mentioned above, in general the system of the invention can be considered an airborne pollution capture system. It can comprise at least one source containment means, at least one suction means to generate air flow to at least one filter means that traps air pollution, and at least one exhaust means to remove the treated air from the proximity of the user. In embodiments, the present invention also comprises an airborne pollution capture system with a source containment means that can immediately capture airborne pollutant molecules from an atomizer or any object that will emit a spray. The system may be portable (i.e., designed to be light and small enough for an average adult to carry unassisted by mechanical aids) or stationary.

In embodiments, the CAPS system is portable, which allows flexibility as to how the system is used. In one embodiment, the system can be carried on the back of a worker. In other embodiments, the system can be hand carried or wheeled on a cart. In further embodiments, the system is larger and can be moved using a vehicle such as a truck. This allows flexibility as to how much air pollution needs to be removed from an area.

Figure 5:
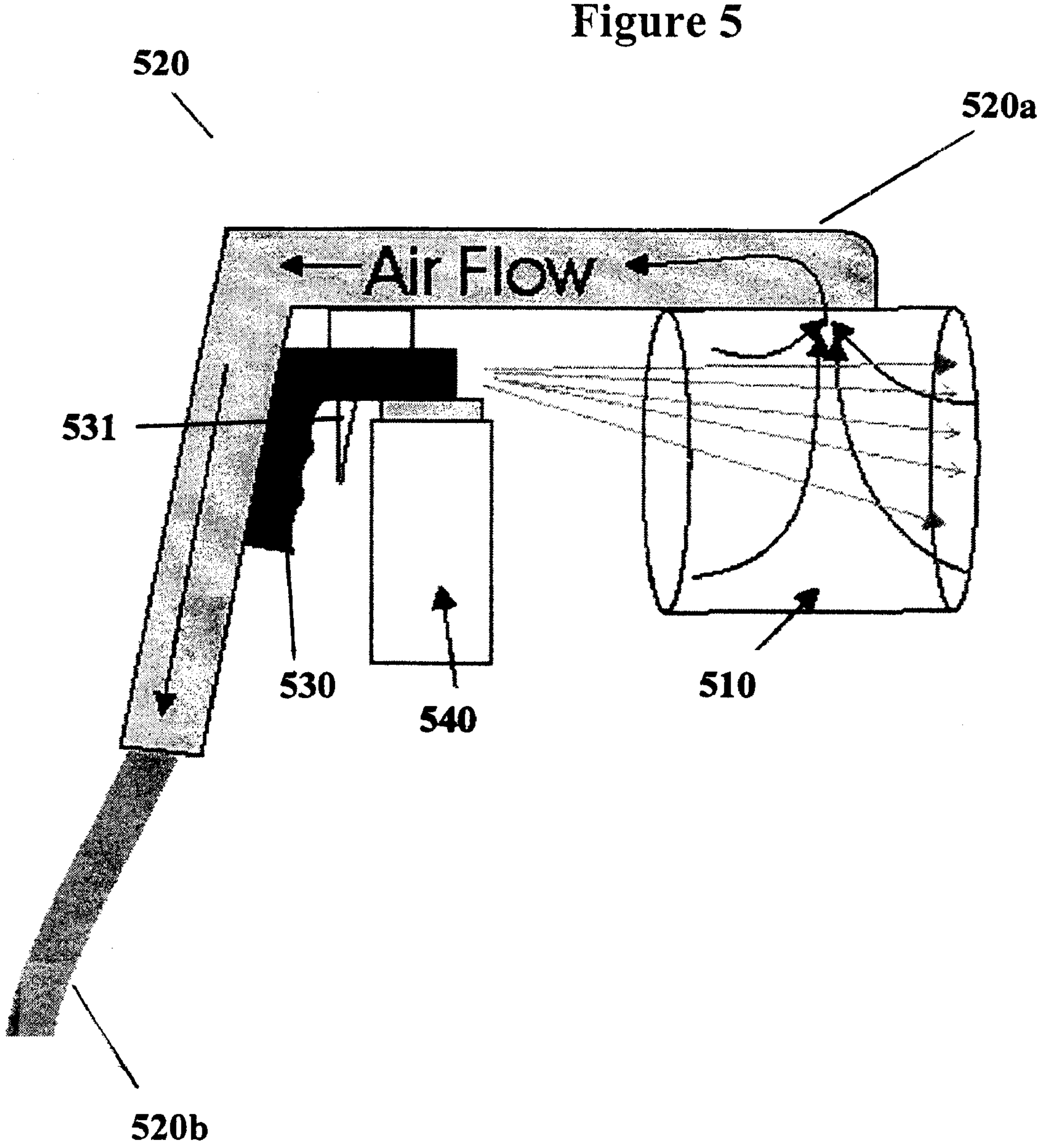
FIG. 5 shows a close-up view of an embodiment of the source containment means in use with an aerosol spray can.

As should be evident, in embodiments, the system of the invention is transportable. In some embodiments, the CAPS system can be carryable. For example, it can be carried on the back of a user, such as in the form of a backpack (as seen in FIG. 5). Likewise, it can be carried in front of a user, such as in the form of a frontpack. Alternatively, it can be slung over one or both shoulders. It also may be configured to be mounted on a four wheel or hand cart so that it may be transported to sites of interest. In essence, the system may be configured in any fashion to allow one to transport or carry it, such as through inclusion of one or more handles, straps, recesses, etc. (as seen, for example, in FIG. 1).

The system, and in particular the end of the system comprising the source containment means, can be flexible and maneuverable around the object of work. In one embodiment, the source containment means is hand held and can easily be moved by hand around the work area (typically by way of it being attached to a flexible evacuation means of suitable length). For example, when spray painting a car, the user can easily manipulate the CAPS system around the car. In another embodiment, a larger version of the CAPS system would not be hand held but would be rotated around the car in a mechanical way. In both embodiments, the source containment means is moved around the work to function.

The system of the present invention can be used in a method of reducing or eliminating release of pollutants into the environment by compositions. In general, the method comprises: connecting a system according to the invention to a device for containing or distributing a composition comprising at least one pollutant; and employing the system. The system can be any system disclosed herein, comprising some or all of the elements or means discussed above. The method can be practiced to reduce or eliminate release of pollutants (including toxic compounds or compounds that are otherwise hazardous to human, animal, or plant life) from compositions. By reducing release, it is meant reducing, by any detectable amount, one or more substances that are known or suspected of being toxic or harmful to living organisms, and particularly humans, where reduction is determined by comparison to the amount released under the same conditions, but without use of the presently disclosed system. Numerous such compounds are known, and various lists of such compounds are maintained by state and federal agencies in the U.S. and abroad. As used herein, elimination means to reduce to a level that is undetectable using standard detection methods for a particular substance.

According to the method, a system of the invention is connected to one or more devices or containers containing a composition comprising a pollutant. The devices or containers may be any devices or containers that are suitable for holding and/or dispensing compositions that comprise pollutants. For example, a device may be a spray gun for spraying coatings, such as paints and adhesives. Alternatively, the container may be a can, jar, or other vessel that is suitable for containing coatings, industrial solvents or other chemicals, cleaners, and the like. Accordingly, connecting the system to the device or container may involve providing a connection means of suitable size and shape to connect to a particular device or container. For example, the system may be connected to a spray gun by way of a screw-thread fastening means that attaches to the nozzle of the spray gun. Alternatively, it may be connected to a vat containing cleaning solution by friction fit along the rim of the vat. Those of skill in the art can envision numerous other types of connections that may be fashioned, and all such means need not be disclosed herein for those of skill in the art to devise appropriate connectors.

The method of the invention also comprises employing the system of the invention. As used herein, employing comprises any action that results in the system of the invention removing at least one pollutant from an environment. Typically, employing comprises providing power to the suction means such that a negative pressure is developed within the source containment means and the evacuation means, which results in removal of environmental air (and particles therein) into the evacuation means, and ultimately into the filtration means of the system. Where the suction means is powered by electricity, employing may comprise providing electricity to the suction means and using the electricity to run an electric motor to create a negative pressure. Alternatively, where the suction means is powered by a fossil fuel (e.g., gasoline, diesel), employing may comprise providing the fuel and starting an internal combustion engine to create a negative pressure.

According to the method of the invention, employing the system may also comprise placing the source containment means in close proximity to the pollutant(s) of interest. By close proximity, it is meant a distance that is sufficiently close to the pollutant(s) that the negative pressure provided by the suction means can capture some or all of the pollutant(s) of interest.

The method reduces or eliminates the release of at least one airborne pollutant molecule into the environment from a composition. In embodiments, the method captures at least one airborne pollutant molecule from the environment. The airborne pollutant may be in the environment as a result of dispensing of a composition comprising it, or as a result of natural phenomena, such as evaporation. In many situations, the system captures vapors emanating from the composition. In some situations involving spraying of materials onto a surface or into an area of interest, the system captures overspray, preferably in addition to capture of vapors.

In one embodiment of the present invention, the particulate and vapor airborne pollutant molecules are immediately captured (i.e., before they become part of the surrounding environment). For example, as soon as spray is released from a spray gun, the source containment means captures the overspray and vapors created by release of the spray from the gun. This action contains the airborne pollutant molecules and limits the pollutants that are released into the environment. In still another embodiment, an open container has the CAPS system mounted on it so the source containment means covers almost all or all of the surface of the open container. Therefore, airborne pollutant molecules, and particularly vapors, that diffuse into the air are immediately captured by the CAPS system. In embodiments, up to 95% or more of airborne pollutant molecules are captured by the system. For example, about 50% or more, about 55% or more, about 60% or more, about 65% or more, about 70% or more, about 75% or more, about 80% or more, about 85% or more, about 90% or more, about 95% or more, about 98% or more, or about 99% or more of the airborne pollutant molecules are captured. These embodiments are more efficient at capturing airborne pollutant molecules immediately than the prior art listed above. For example, U.S. Pat. No. 6,395,047 has a two-tube source containment means that captures some airborne pollutant molecules. However, while that system is useful and has advantageous features, many more pollutant molecules, as compared to the present invention, are lost to the environment before the negative pressure from the tubes can capture them. Indeed, approximately 75% of the pollutant molecules may be lost to the environment using that system, although the amount will vary depending on the ambient air currents.

Thus, the present invention provides methods to reduce or eliminate the number of airborne pollutant molecules released into the environment from compositions. In essence, the methods of the invention comprise employing the CAPS system to eliminate the release of at least one airborne pollutant into the environment. Stated in another way, the methods of the invention comprise employing the CAPS system to capture at least one airborne pollutant from the environment. In exemplary embodiments, the methods of the invention comprise providing the CAPS system, capturing the airborne pollutants, filtering the contaminated air, and then releasing the treated air through an exhaust means.

A noteworthy feature of embodiments of the present invention is the ability of the system and its components to capture a vast majority of the airborne pollutants emitted by spray equipment. Experiments show that the system and its components, and in particular systems comprising a containment cage according to the present invention, can capture upwards of 95% or more of airborne pollutants created by spraying, atomizing, etc. Another noteworthy feature of the invention is that it improves the transfer efficiency of devices for applying substances to surfaces. While not being held to any particular mode of action, transfer efficiencies are presumably improved as a result of make-up air entering the containment cage, for example, through the proximal end of the containment cage.

Turning now to the figures, and referring now specifically to FIG. 1, an embodiment of the CAPS system 10 is shown. A conventional hand spray gun 20 is shown affixed to its reservoir 25 of coating. It is recognized that reservoir 25 may contain lubricants, paints, insecticides, herbicides, insulation, caulks, coatings, radar absorbing materials, chemicals, as well as any other material which causes airborne pollutant molecules to go into the atmosphere. Paint is used herein as an exemplary composition only. The overspray capture enclosure 30 is connected to the front of the hand spray gun 20 A make up air intake 40 is in between the hand spray gun 20 and the overspray capture enclosure 30. A suction hose 50 is connected to the bottom of the overspray capture enclosure 30. The overspray capture enclosure 30 has appropriate connections to be securely affixed to suction hose 50. The other side of suction hose 50 is connected to input side 55 of the filter enclosure 60. The filter enclosure 60 includes a handle 62 and preferably contains at least one NESHAP compliant filter (not depicted). A second suction hose 70 is connected to the output side 65 of the filter enclosure 60. This takes the treated air to the input side 75 of the suction generator 80. The suction generator 80 includes a motor which generates the suction and can be of sufficient horsepower for any requirement desired. An exhaust hose 90 is connected at the output side 85 of the suction generator 80.

Figure 2:
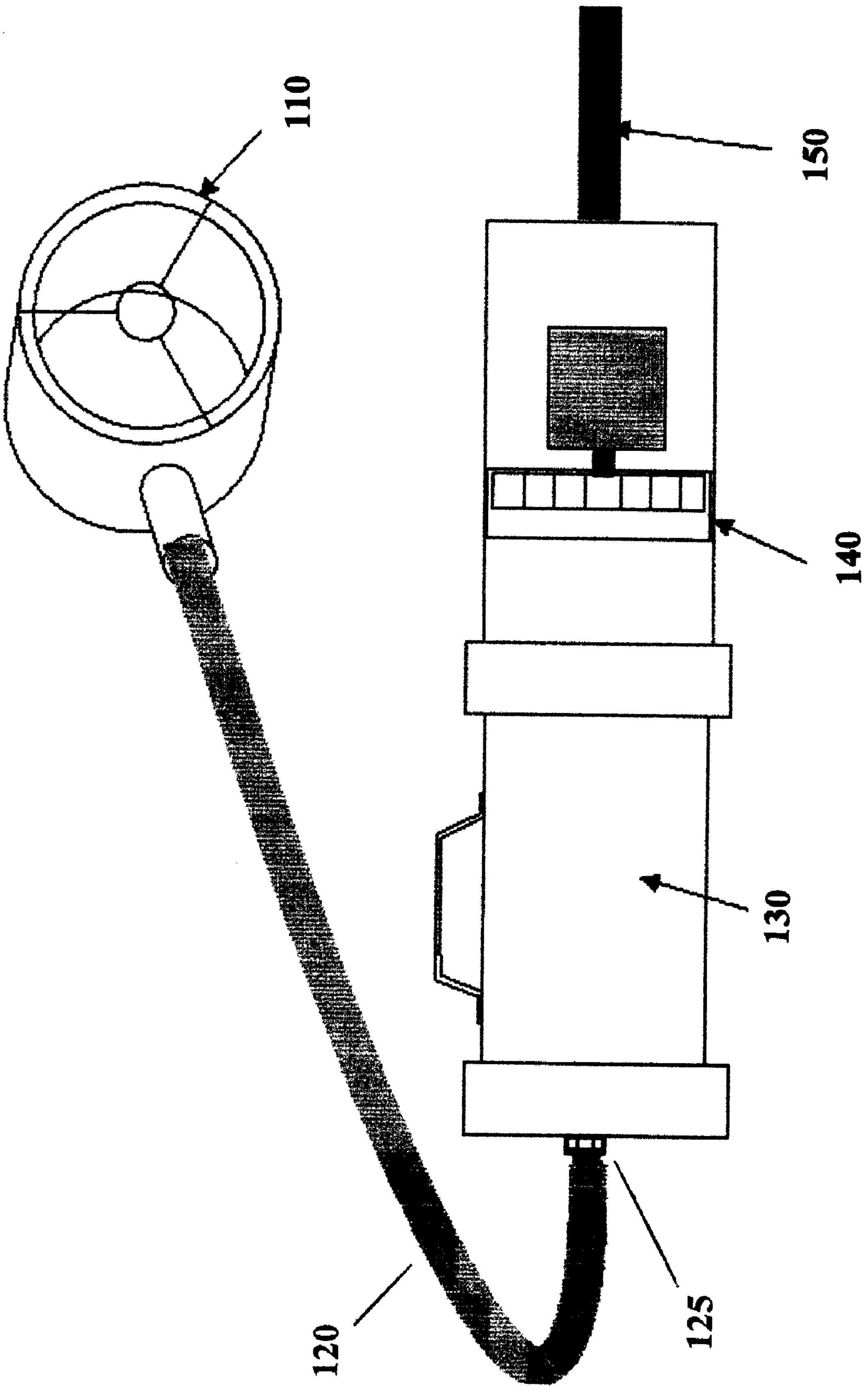
FIG. 2 shows an embodiment of the CAPS system of the invention in which the filter means and the suction means in an integral relationship.

In FIG. 2, an embodiment showing a combined filter enclosure and suction generator is shown. An air pollution source containment enclosure 110 is depicted, which can be connected with minor modification to a conventional hand spray gun (such as element 20 of FIG. 1), to an aerosol spray can (such as element 340 of FIG. 5), or can be made to a size and shape to fit over an open container of chemicals or any other substance that gives off airborne pollutant molecules. For example, a container of chemicals used in cleaning and repairing composite materials can be opened with the air pollution source containment enclosure 110 of the CAPS system over the container. Airborne pollutant particles can be evacuated by the CAPS system thereby protecting the user and other people in the vicinity of the user. The source containment enclosure 110 can either be fitted over the container so it is not necessary for a user to hold it or can be held by the user over the container.

The enclosure 110 is connected to a suction hose 120 in which the contaminated air is conveyed to the filter enclosure 130. The suction hose 120 is connected to the input side 125 of the filter enclosure 130. Filter enclosure 130 is directly affixed to suction generator 140. Exhaust hose 150 is attached at the output side of suction generator 140.

Figure 3:
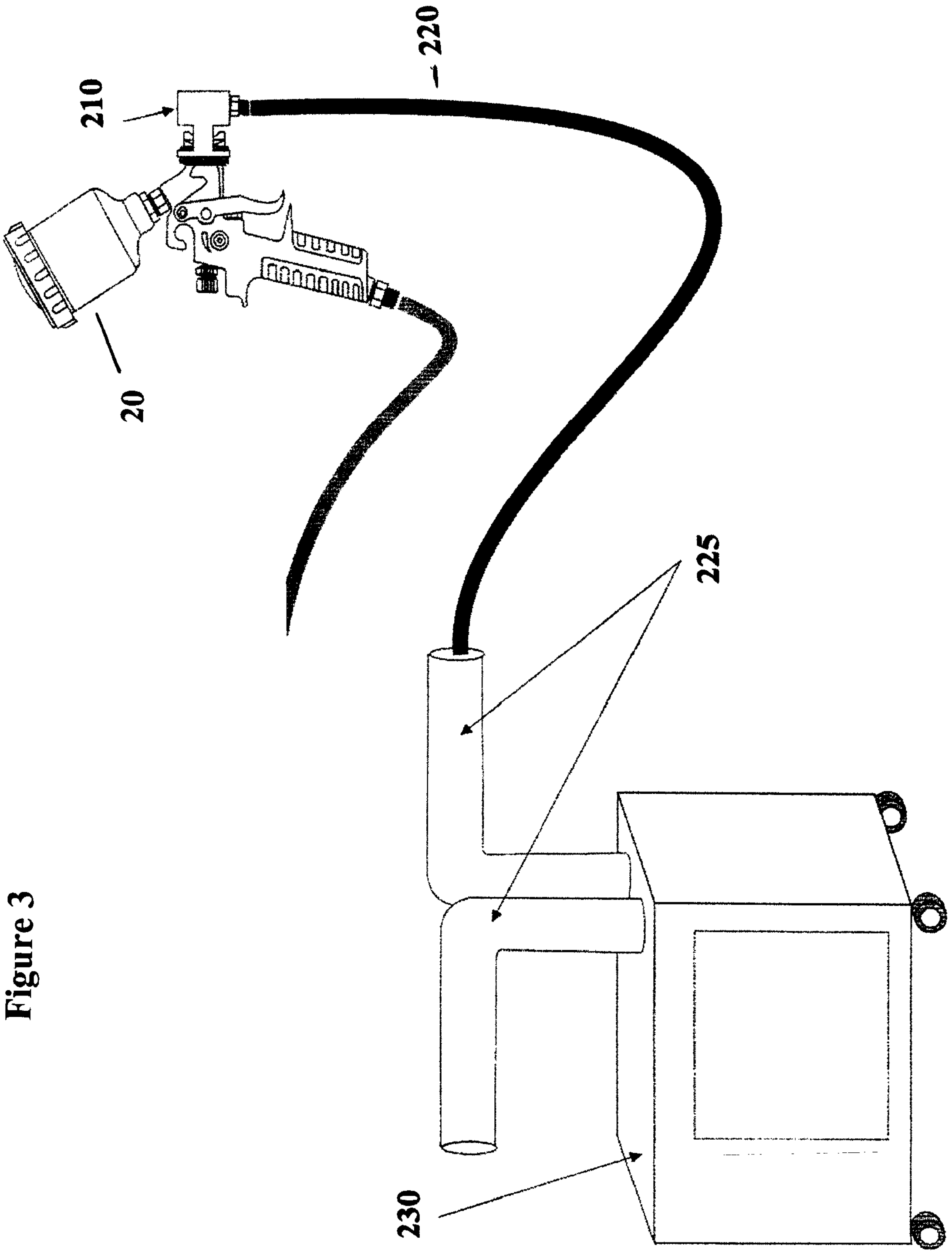
FIG. 3 shows an embodiment of the CAPS system of the invention in which the filter means and suction means are employed in an integrated unit that can service more than one source containment means.

In a third exemplary embodiment of the CAPS system, the filter enclosure and the suction generator are separated but are still housed in a single container. An example of this embodiment is depicted in FIG. 3. The air pollution source containment enclosure 210 can be connected with minor modification to a conventional hand spray gun 20, to an aerosol spray can (such as element 340 of FIG. 5), or can be made to a size and shape to fit over an open container of chemicals or any other substance that gives off airborne pollutant molecules. The enclosure 210 has provision for make up air to be introduced and is connected to a suction hose 220 in which the contaminated air travels. The suction hose 220 is connected to the input side 225 of the filter enclosure 230, which, in this example, is about 4 feet in height, width, and depth. In this example, the suction hose can be about 35 feet in length (about 10 meters). Furthermore, two intake ducts are provided for connection of two suction hoses and two containment cages, although only one is depicted as connected to a hose. In this example, each intake duct can be about 10-14 feet (about 3 to 4.5 meters) in length. Exhaust from the filter enclosure 230 is by way of an exhaust port (not depicted) and optional hose (not depicted).

Figure 4:
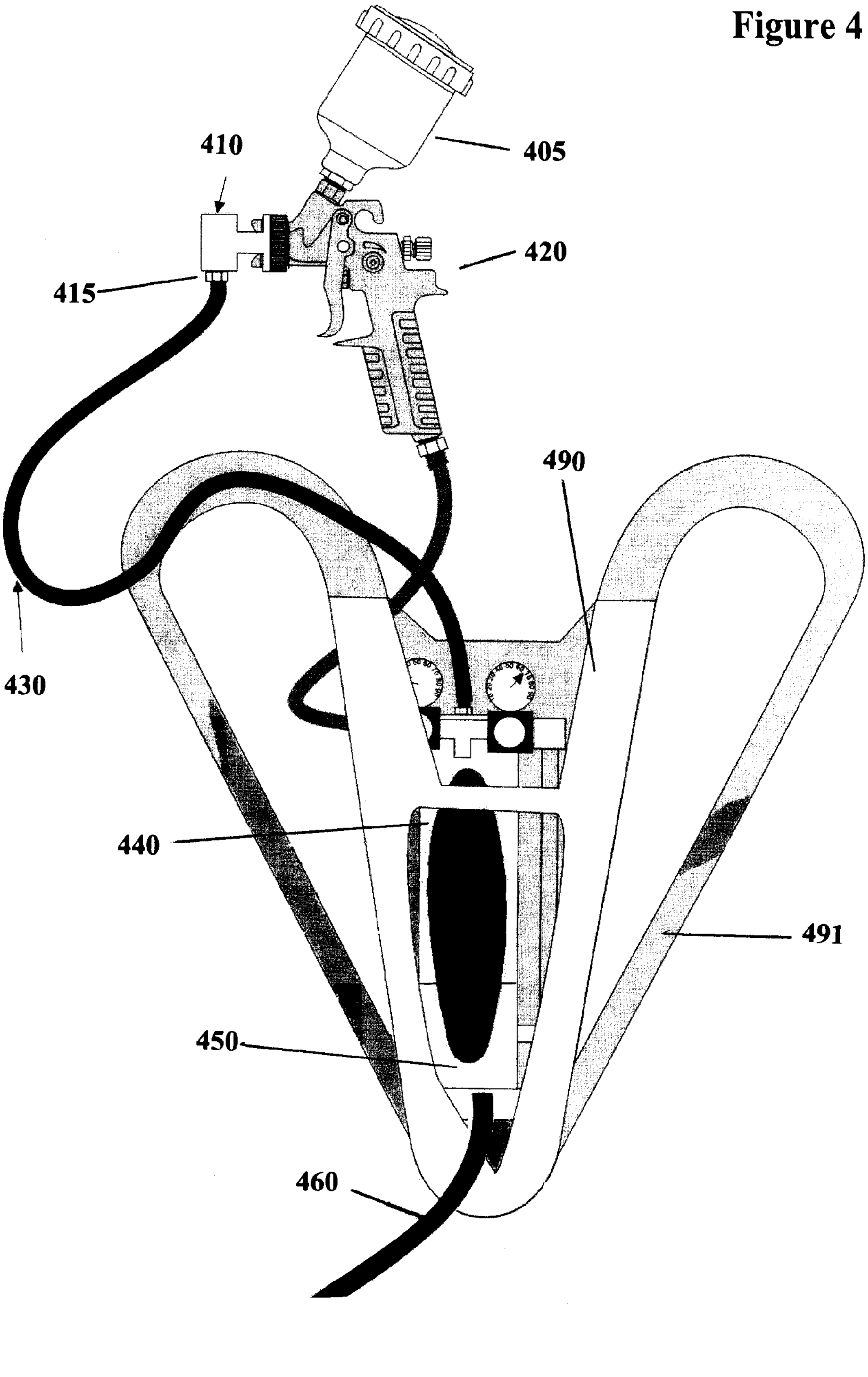
FIG. 4 shows an embodiment of the CAPS system of the invention being employed as a backpack unit that can be carried on the back of a user.

Another embodiment of the invention is depicted in FIG. 4. In this embodiment, the system is provided as a backpack unit for ease of use in tight or cramped areas. A reservoir 405 for containing a substance to be deposited on a surface is attached to a standard spray gun 420. A containment cage 410 is also attached to the spray gun 420 by way of the proximal end of the containment cage. The containment cage 410 is also attached to a suction hose 430 at connection 415 by way of one end of the suction hose. The other end of the suction hose 430 is connected to filter enclosure 440. A suction generator 450 is connected on the other side of filter enclosure 440. An exhaust tube 460 is connected to suction generator 450 to allow for exhaust of filtered air. The entire system is attached to backpack 490 by way of sewn seams and releasable fasteners, such as hook-and-loop fasteners. In use, a worker places the backpack unit on his back and secures it to his torso by way of straps 491. The suction generator 450 is engaged, and the substance to be deposited on a target surface is released from the container 405 by way of spray gun 420. Airborne pollutants released by the spraying are contained by the containment cage 410, filtered, and exhausted.

Yet another exemplary embodiment of the invention is shown in FIG. 5. In this figure, a containment cage 510 and a two-part evacuation tube 520 of the invention are depicted in conjunction with an aerosol spray can 540. In this example, a standard aerosol spray can 540 is attached to a handle 530, which comprises a trigger device 531, which can be used to open the valve for the spray can and permit pressurized contents to be released. The handle 530 is attached (permanently or removably) to the upper section of evacuation tube 520*a*. The containment cage 510 is attached to the upper section of evacuation tube 520*a* by way of an exit port (not depicted) defined by a nipple (not depicted). As shown, in this example, the source containment cage 510 is not directly attached to the atomizer. Upper evacuation tube 520*a* is a tube that includes an air pathway that allows air flow containing airborne pollutant molecules to travel from the containment cage 510 to the lower section of evacuation tube 520*b*, and then to a filtration unit (not depicted).

In use, overspray from the aerosol can is contained within the containment cage 510 or removed from the environment immediately upon release, and evacuated into tube 520*a* and 520*b*. Although depicted as an "L" shaped element, upper evacuation tube 520*a* can be any shape that allows it to function as an attachment piece for the aerosol spray can. Evacuated air is sent to a filtration unit by the negative pressure developed across the system by a suction generator. The filtered air is ultimately released into the environment by way of an exhaust port downstream of the filtration unit. Airflow through the system is depicted with arrows.

Figure 6:
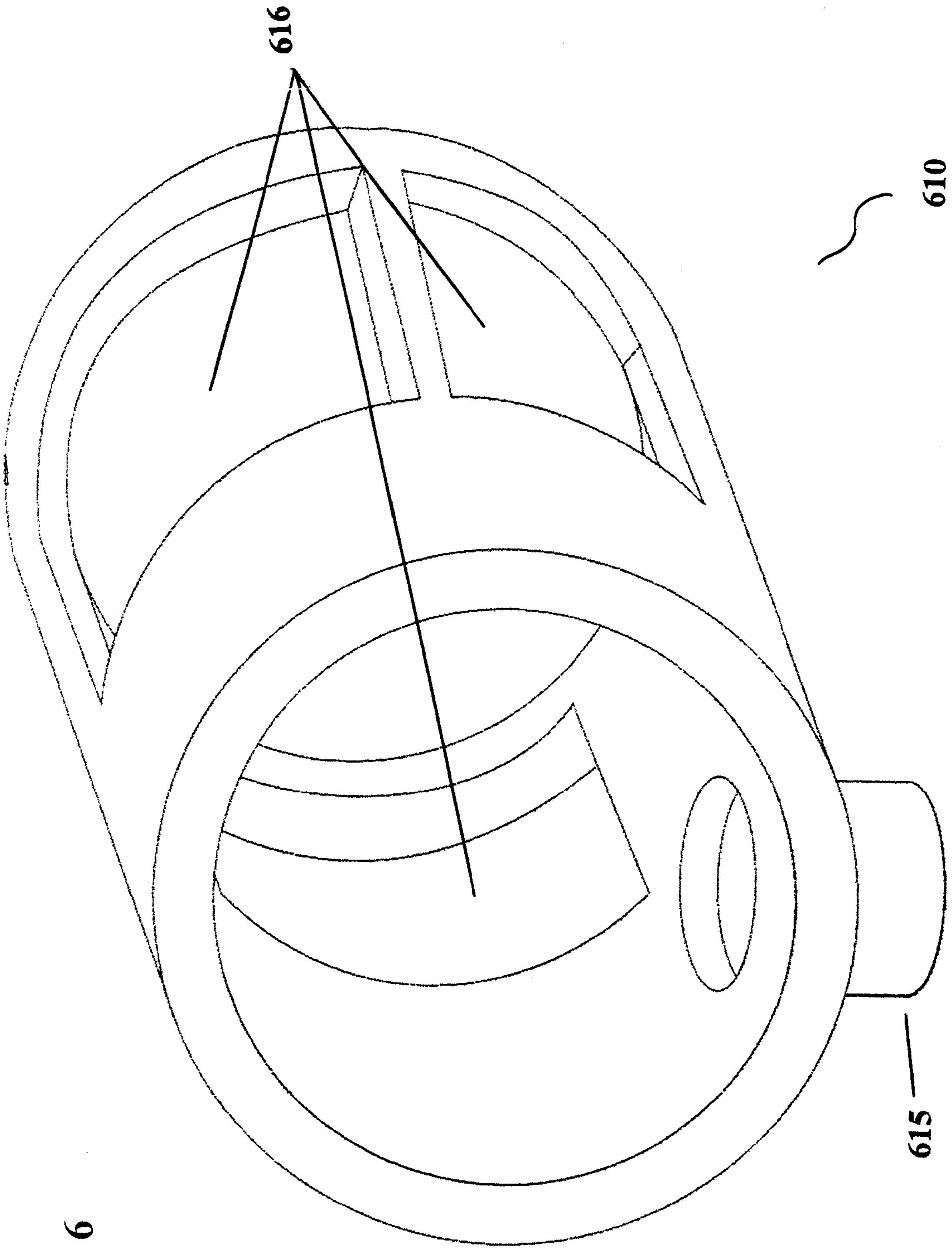
FIG. 6 shows a close-up perspective view of an embodiment of the source containment means.

In yet another example of a containment cage of the invention, a close-up perspective view of a cage is provided in FIG. 6. In this example, make-up air ports are provided in the walls of the cage to supplement air intake from the front and rear of the device. More specifically, FIG. 6 shows a containment cage 610 having an exit port 615 located at the distal end of the cage, for evacuation of air and airborne pollutants. Toward the center and proximal end of the cage, three air in-take ports 616 are disposed within the wall of the cage. In operation, a substance to be applied to a target surface enters the containment cage at the proximal end and traverses the cage, exiting the distal end. A suction pump (not depicted) connected to the cage by way of the exit port 615 creates a negative pressure in and immediately surrounding the cage. Environmental air, some of which contains pollutants from the substance is pulled into the cage and through the exit port through the cage openings at the proximal and distal ends, and also through ports 616.

Figure 7:
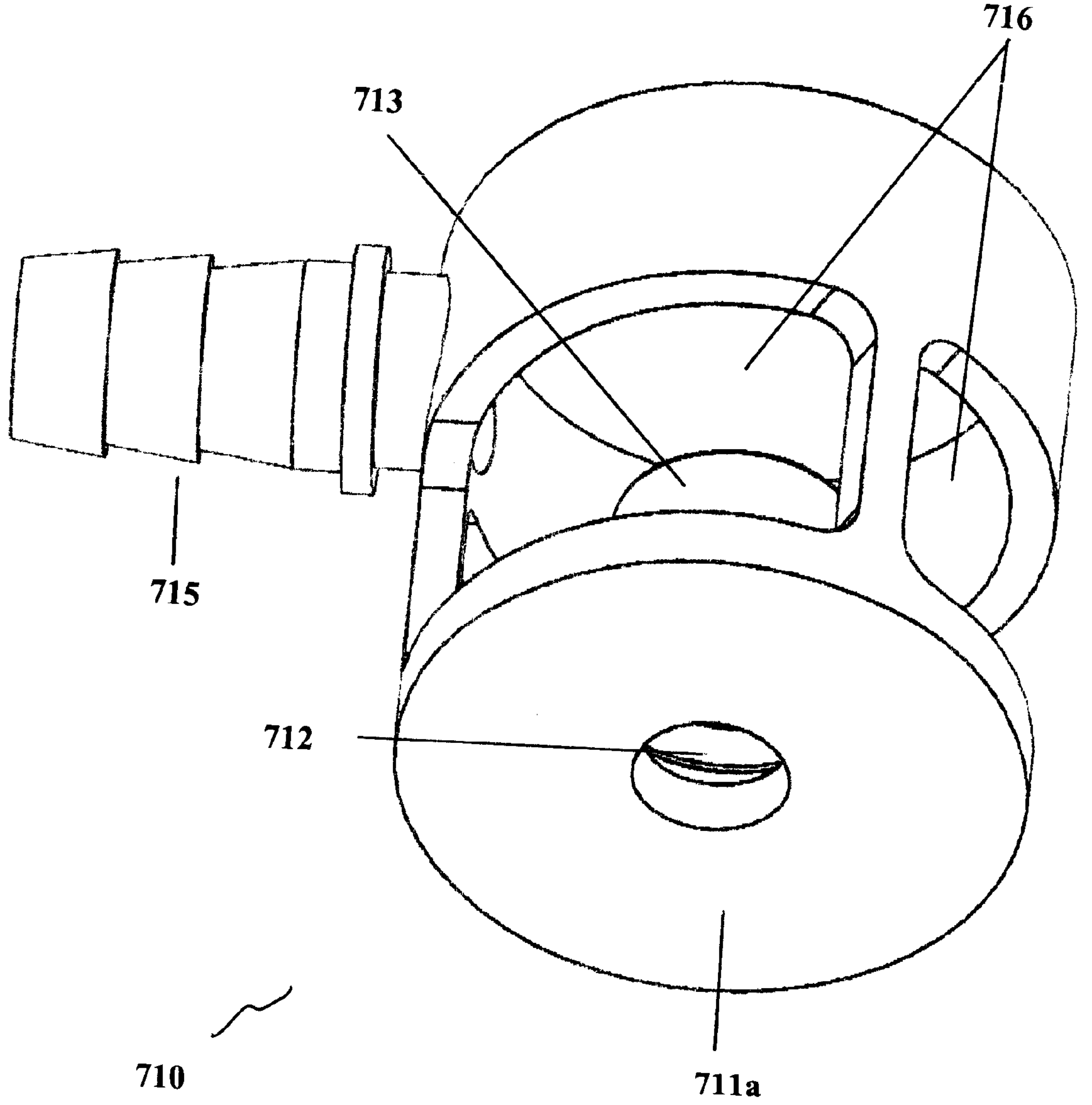
FIG. 7 shows a close-up perspective view of an embodiment of the source containment means.

Yet another exemplary embodiment of the containment cage of the invention is depicted in FIG. 7. In this example, containment cage 710 comprises a proximal end defined partially by an exterior surface 711*a* having a central hole 712 by which containment cage 710 may be attached to a device for dispensing liquid (not depicted). In this embodiment, the device (not depicted) is inserted through central hole 712 and connects with nozzle 713. Make-up air intake ports 716 are provided as openings in the containment cage wall. Exit port 715 is disposed within and extending from the containment cage wall. In this embodiment, exit port 715 is a ridged structure that is suitable for accommodating, by way of friction fit, a flexible rubber or plastic tube.

Figure 8:
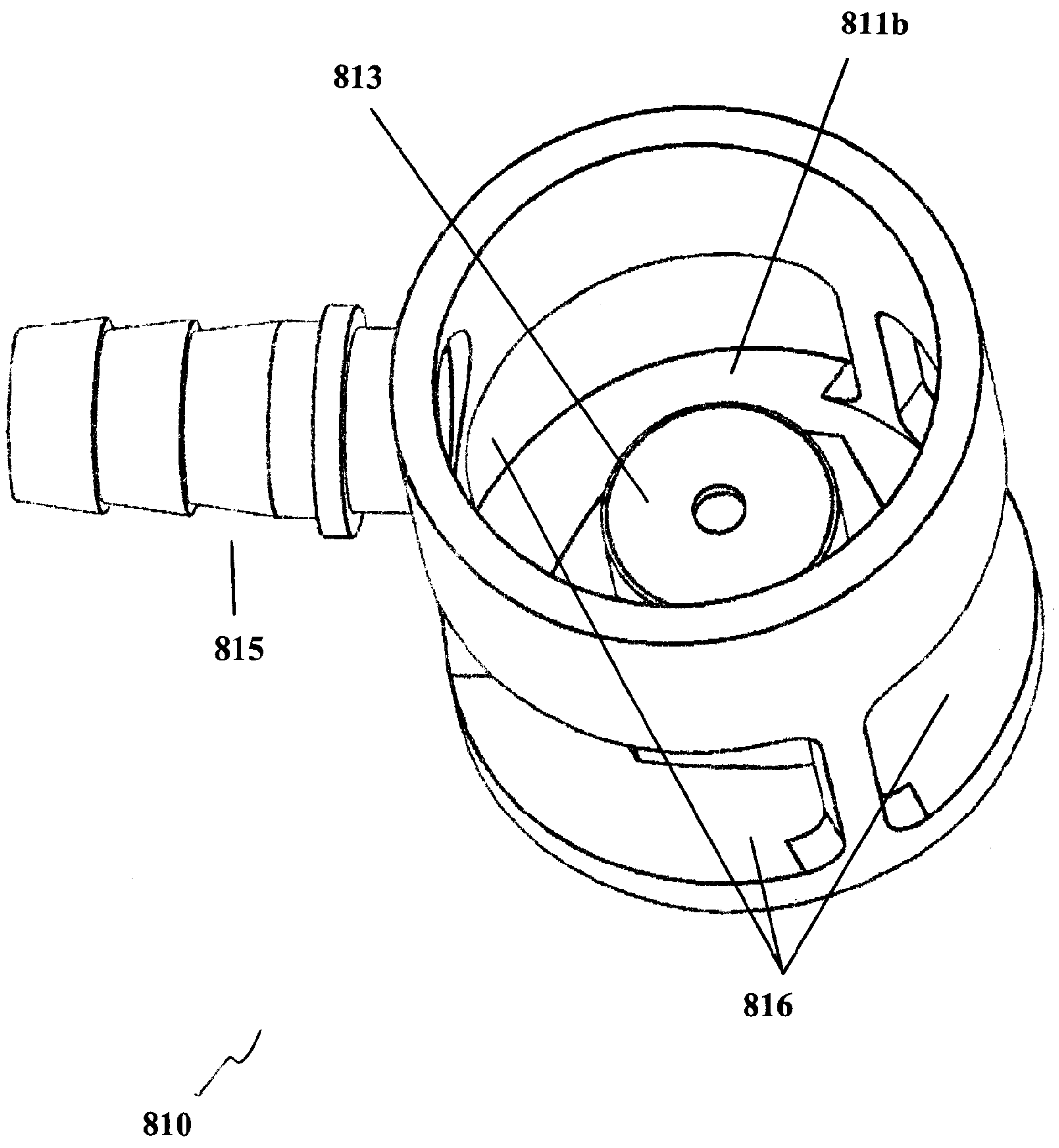
FIG. 8 shows the source containment means of FIG. 7 from a different angle.

FIG. 8 shows a different view of the embodiment of the containment cage shown in FIG. 7, depicted here as containment cage 810. In FIG. 8, details of nozzle 813 are shown. In this embodiment, nozzle 813 is removably attached to the proximal end of the cage defined partially by interior surface 811*b*. Nozzle 813 may be removed at any time and replaced with another nozzle having the same or a different size and shape. Make-up air intake ports 816 are provided as openings in the containment cage wall. Exit port 815 is disposed within and extending from the containment cage wall.

Figure 9:
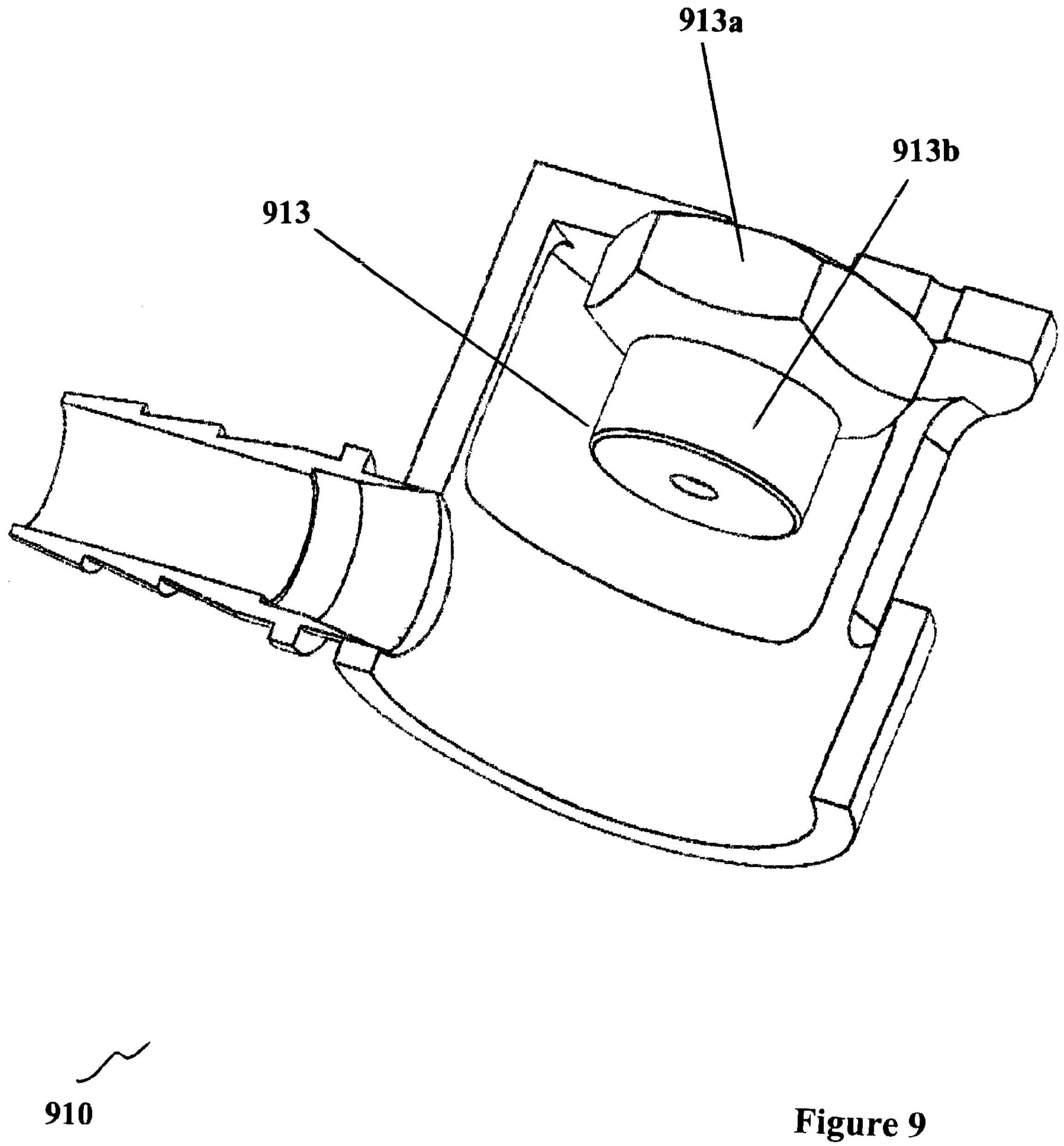
FIG. 9 depicts a cross-section of the source containment means of FIGS. 7 and 8.

FIG. 9 depicts a cross-section of the containment cage of FIGS. 7 and 8, depicted here as containment cage 910. In this figure, nozzle 913 is shown as having a hexagonal base portion 913*a* and a distal head portion 913*b*. Base 913*a* is shaped to be suitable for engagement with a standard socket wrench (of any suitable size), allowing for easy attachment and removal of nozzle 913 and containment cage 910 by way of screw threads (not depicted) that engage complementary screw threads (not depicted) disposed in or on a device to which the containment cage is to be attached.

Figure 10:
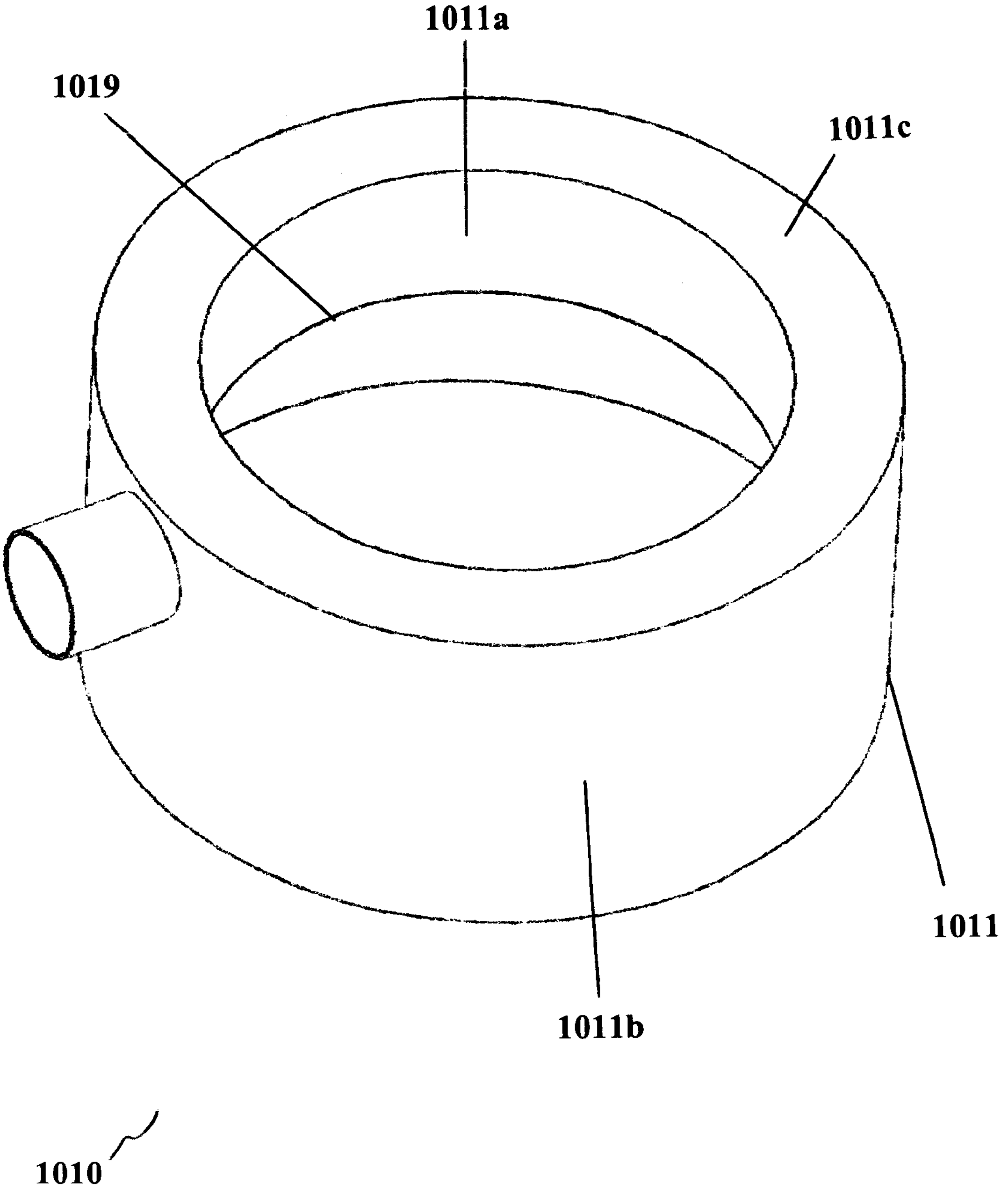
FIG. 10 shows a close-up perspective view of yet another embodiment of the source containment means.

FIG. 10 depicts another exemplary embodiment of the containment cage of the invention. In this figure, a containment cage that is designed for use with a container with a circular opening is depicted. The containment cage 1010 comprises a wall 1011 defined at least in part by an interior surface 1011*a* and an exterior surface 1011*b*, and a distal end surface 1011*c*. The containment cage comprises an exit port 1015 extending from exterior surface 1011*b* and connected to the interior of the cage by way of a through-hole in the cage wall 1011. Interior surface 1011*a* is a discontinuous surface that comprises a lip 1019 for placement of the containment cage onto the rim of a container (not shown).

Figure 11:
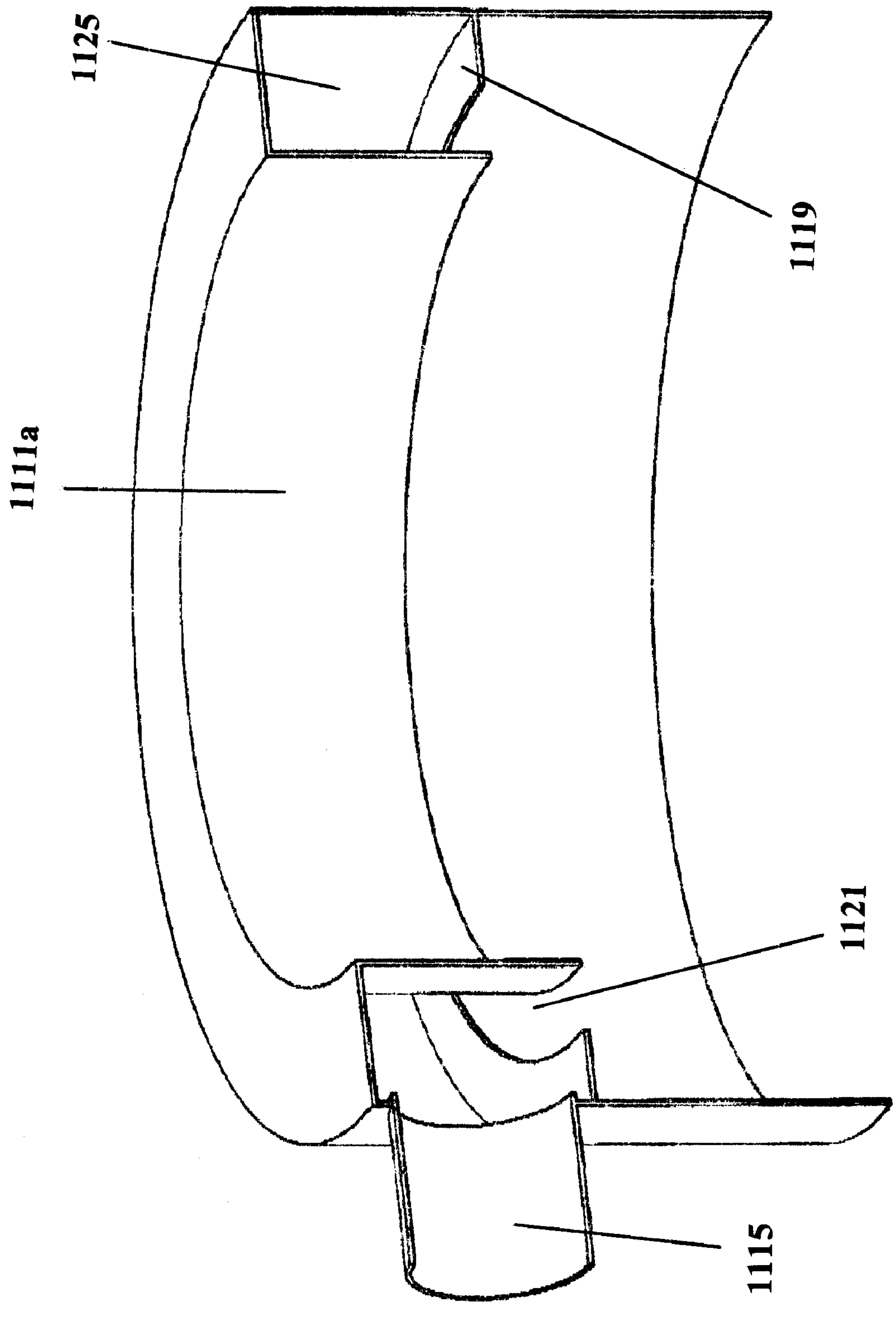
FIG. 11 depicts a cross-section of the source containment means of FIG. 10.

FIG. 11 shows a cross-section of the containment cage of FIG. 10. In this figure, the discontinuity of interior surface 1111*a* is depicted in detail, as is lip 1119. A space 1121 defined by the discontinuity of interior surface 1111*a* at lip 1119 provides a port through which air is drawn from the environment and the container (not depicted) into collection duct 1125 and removed via exit port 1115. In practice, drawing in of air from the environment into collection duct 1125 from the distal end of the containment cage creates a barrier for escape of pollutants from the container. Furthermore, drawing in of air into collection duct 1125 from within the container confines, traps, or contains pollutants released by the substances in the container.

It will be apparent to those skilled in the art that various modifications and variations can be made in the practice of the present invention and in construction of the system of the invention without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims.

The invention claimed is:

1. A portable apparatus for removing or reducing airborne pollutant molecules from an area, wherein the portable apparatus comprises a source containment cage comprising:

at least one outer surface defining an exterior of the cage, at least one inner surface defining an interior of the cage, a proximal surface defining a proximal end of the cage, comprising a connector that connects the containment cage to a source of pollutant molecules, and comprising at least one opening for receiving at least one pollutant molecule, a distal surface defining a distal end of the cage, comprising at least one opening for releasing at least one pollutant molecule, at least one opening in the inner and outer surfaces, which are in communication with each other to form a passage through the inner and outer surfaces, and which comprises a connector that connects the containment cage to a source of negative pressure, and at least one other opening in the inner and outer surfaces, which are in communication with each other to form a passage through the inner and outer surfaces, and which comprise a port for taking in air from the environment surrounding the containment cage.

2. The apparatus of claim 1, wherein the source comprises a dispensing device comprising an atomizer.

3. The apparatus of claim 2, wherein said atomizer is a spray gun, an aerosol can comprising a spray nozzle, or a hand air pump.

4. An apparatus for removing or reducing airborne pollutant molecules from an area, said apparatus comprising:

the portable apparatus of claim 1;

a first suction hose comprising a first and second end, which is connected on the first end to said portable apparatus;

a filter enclosure connected to said first suction hose on the second end of the suction hose;

a second suction hose comprising a first and second end, said second suction hose connected to said filter enclosure on the first end, and to a suction generator on the second end; and an exhaust hose comprising a first and second end, said first end connected to said suction generator and said second end terminating in an environment.

5. The apparatus of claim 4, wherein the filter enclosure comprises at least one filter that is compliant with one or more international, federal, state, or local laws, requirements, or ordinances.

6. The apparatus of claim 4, further comprising an atomizer connected to said portable apparatus, wherein said atomizer is a spray gun, an aerosol can, or a hand pump.

7. The apparatus of claim 4, wherein the apparatus is portable.

8. A method of removing or reducing airborne pollutant molecules from an area, said method comprising:

using an apparatus comprising:

at least one source containment cage for immediately capturing at least one airborne pollutant molecule released from a source;

wherein said source containment cage comprises at least one outer surface that defines an exterior of the cage, at least one inner surface that defines an interior of the cage, a proximal surface that defines a proximal end of the cage, comprising a connector that connects the containment cage to a source of pollutant molecules, and comprising at least one opening for receiving at least one pollutant molecule, a distal surface that defines a distal end of the cage, comprising at least one opening for releasing at least one pollutant molecule, at least one opening in the inner and outer surfaces, which are in communication with each other to form a passage through the inner and outer surfaces, and which comprises a connector that connects the containment cage to a source of negative pressure, and at least one other opening in the inner and outer surfaces, which are in communication with each other to form a passage through the inner and outer surfaces, and which comprise a port for taking in air from the environment surrounding the containment cage at least one device for generating negative pressure, at least one filter for removing said at least one airborne pollutant molecule, and at least one exhaust for carrying said at least one airborne pollutant molecule away from the vicinity of the user;

wherein using comprises containing said at least one airborne pollutant molecule within said source containment cage;

capturing said at least one airborne pollutant molecule into said apparatus;

filtering the captured air; and exhausting the filtered air to a site that is distant from the source containment cage.

9. The method of claim 8, wherein exhausting the filtered air comprises exhausting filtered air at a point greater than 2 meters from the source containment cage.

10. The method of claim 8, comprising connecting the apparatus to a device capable of dispensing a composition comprising at least one pollutant.

11. The method of claim 8, wherein the method captures at least one airborne particulate pollutant molecule released from the source, at least one airborne vapor pollutant molecule released from the source, or both.

12. The method of claim 11, wherein the vapor is a volatile organic compound (VOC).

13. The apparatus of claim 4, wherein the apparatus removes or reduces airborne particulate pollutant molecules from an area, airborne vapor pollutant molecules from an area, or both.

14. The apparatus of claim 13, wherein the vapor is a volatile organic compound (VOC).

15. The apparatus of claim 4, wherein the portable apparatus is connected to the first suction hose by an airtight or watertight seal.

16. The portable apparatus of claim 1, wherein the portable apparatus removes or reduces airborne particulate pollutant molecules from an area, airborne vapor pollutant molecules from an area, or both.

17. The portable apparatus of claim 16, wherein the vapor is a volatile organic compound (VOC).

* * * * *